United States Patent
Geis et al.

(10) Patent No.: US 12,279,743 B2
(45) Date of Patent: Apr. 22, 2025

(54) METHOD FOR THE IMPROVED CLEANING OF EDGES OF A WALL

(71) Applicant: BSH Hausgeräte GmbH, Munich (DE)

(72) Inventors: Julius Geis, Burkardroth (DE); Michael Hohmann, Bad Neustadt a.d. Saale (DE); Juri Gebel, Hohenroth (DE); Dominik Schreiner, Kalbach (DE)

(73) Assignee: BSH Hausgeraete GmbH, Munich (DE)

( * ) Notice: Subject to any disclaimer, the term of this patent is extended or adjusted under 35 U.S.C. 154(b) by 290 days.

(21) Appl. No.: 18/004,091

(22) PCT Filed: Jun. 23, 2021

(86) PCT No.: PCT/EP2021/067086
§ 371 (c)(1),
(2) Date: Jan. 3, 2023

(87) PCT Pub. No.: WO2022/002709
PCT Pub. Date: Jan. 6, 2022

(65) Prior Publication Data
US 2023/0270304 A1    Aug. 31, 2023

(30) Foreign Application Priority Data
Jul. 3, 2020   (DE) ..................... 10 2020 208 400.9

(51) Int. Cl.
*G05D 1/00* (2024.01)
*A47L 9/28* (2006.01)

(52) U.S. Cl.
CPC .......... *A47L 9/2805* (2013.01); *A47L 9/2852* (2013.01); *A47L 9/2894* (2013.01); *G05D 1/0274* (2013.01); *A47L 2201/04* (2013.01)

(58) Field of Classification Search
CPC .... A47L 9/2805; A47L 9/2852; A47L 9/2894; A47L 2201/04; A47L 2201/00;
(Continued)

(56) References Cited

U.S. PATENT DOCUMENTS 11,278,177 B2 *  3/2022  Lin ..................... G05D 1/0242
2016/0353955 A1 * 12/2016  Holz ......................... A47L 9/00
(Continued)

FOREIGN PATENT DOCUMENTS

| DE | 102008014912 A1 | 9/2009 |
| DE | 102012100324 A1 | 7/2013 |
| EP | 3058860 A1 | 8/2016 |

*Primary Examiner* — Bhavesh V Amin
*Assistant Examiner* — Esvinder Singh
(74) *Attorney, Agent, or Firm* — Laurence A. Greenberg; Werner H. Stemer; Ralph E. Locher

(57) ABSTRACT

A method of using a cleaning robot for improved cleaning of edges of a wall having a projecting baseboard, includes using the robot to strike the baseboard in a first cleaning pass, causing an impact sensor to generate a first signal and a distance sensor to detect a first distance from the wall. The robot continues its first cleaning pass and strikes the baseboard a further time, causing the impact sensor to generate a second signal and the distance sensor to detect a second distance from the wall. A computer of the robot uses the signals to calculate two spatial points and a first straight line running through the points. The computer uses the distances and the two spatial points to establish an approach boundary of the cleaning robot relative to the wall. The computer controls the cleaning robot during subsequent cleaning passes exclusively using the one distance sensor.

9 Claims, 1 Drawing Sheet

(58) Field of Classification Search
CPC .... G05D 1/0274; G05D 1/648; G05D 1/6484; G05D 1/241; G05D 2105/10; B25J 9/1664; B25J 11/0085
See application file for complete search history.

(56) References Cited

U.S. PATENT DOCUMENTS

| | | |
|---|---|---|
| 2017/0332853 A1 | 11/2017 | Nam et al. |
| 2018/0078106 A1 | 3/2018 | Scholten et al. |
| 2018/0149753 A1 | 5/2018 | Shin et al. |
| 2020/0133291 A1* | 4/2020 | Xiao .................... G05D 1/0274 |

\* cited by examiner

METHOD FOR THE IMPROVED CLEANING OF EDGES OF A WALL

FIELD AND BACKGROUND OF THE INVENTION

The present invention relates to a method for the improved cleaning of edges of a wall, which has a projecting skirting board, by means of a cleaning robot. The invention further relates to a cleaning robot for carrying out the method.

A cleaning robot with wheels and a drive facility and a suction facility is disclosed in US 2017/0 332 853 A1, wherein the drive facility drives the wheels. Air which contains dust can be suctioned via the suction facility. Moreover, the cleaning robot has a sensor facility on an inner face of a front bumper bar, the sensor facility detecting when the cleaning robot strikes against an obstacle.

A self-propelled appliance with a LIDAR sensor is disclosed in US 2018/0 149 753 A1, the size thereof being minimized by a transmitting module and receiving module being separated.

Generally nowadays, in addition to a mostly laser-based sensor system for distance measurement as a main data source for navigation and optionally map creation, a large number of cleaning robots also have a resilient bumper bar with switching impact sensors, also called in short a bumper. This serves to make objects detectable outside a detection range of a main distance sensor system for the cleaning robot, by the cleaning robot striking against the obstacles or objects and the triggered impact sensor identifying the object as an obstacle. These objects can be located outside the detection range, firstly due to the limited lateral spatial resolution of the sensor system (object too small) and secondly due to falling below a measurement level (object too low). The latter, in particular, relates to skirting boards along walls if a distance sensor system is built into the front of the cleaning robot or at the top of the cleaning robot.

In the last-mentioned cases, the cleaning robot often strikes against the skirting board, since a navigation software, which is based on the values delivered by the distance sensor system, assumes a distance from the wall which is greater by the thickness of the skirting board.

With such a cleaning robot, therefore, the cleaning of edges along such skirting boards is not possible or only possible in an unsatisfactory manner.

SUMMARY OF THE INVENTION

The present invention thus relates to the object of specifying a method for the improved cleaning of edges of a wall, which has a projecting skirting board, and in particular overcoming the drawbacks arising from the prior art.

This object is achieved according to the invention by a method for the improved cleaning of edges of a wall. Advantageous embodiments form the subject matter of the dependent claims.

The present invention is based on the general idea of detecting and considering a thickness of a skirting board along a wall and permitting thereby an improved cleaning of edges along a skirting board projecting from a wall, even though the cleaning robot is preferably exclusively navigated via a distance detector. The method according to the invention for the improved cleaning of edges of a wall, which has a projecting skirting board, is carried out by means of a cleaning robot, as follows: initially the cleaning robot is activated and, for example, in a first cleaning pass strikes against the skirting board of the wall, whereupon an impact sensor of the cleaning robot generates a first signal and a distance detector arranged above the impact sensor detects a first distance from the wall. Then the cleaning robot travels back and continues its first cleaning pass until it strikes against the skirting board at least once more. Then the impact sensor generates a second signal while the distance detector at the same time detects a second distance from the wall. A computer facility of the cleaning robot then calculates from the first and second signal two spatial points and a first straight line which runs through these two spatial points. By using the previously determined distances and the two spatial points, the computer facility now determines an approach boundary of the cleaning robot in relation to the wall for subsequent cleaning passes. By the determined first straight line and the associated distances it is now possible for the computer facility to control the cleaning robot during subsequent cleaning passes exclusively via the distance detector, the cleaning robot only traveling as far as the approach boundary and thereby permitting an improved cleaning of edges. In this case, the distances from the wall can be measured by the distance detector via a distance sensor or taken from a map in which the distances for different spatial points have been previously stored. The method according to the invention thus uses the coordinates of the points which have been determined during the cleaning of edges carried out for the first time in a room and which are namely the first and second spatial points in which a contact has occurred with the skirting board and at the same time the distance detector has detected the distances from the wall, the values thereof showing that a greater distance from the wall is present. With the prior knowledge that the skirting boards are attached parallel to the wall, the thickness of the skirting board can be calculated from the two spatial points and the associated first and second distances, by a straight line through the two spatial points being determined, and the standard distance of the determined straight line from the stored wall distance being calculated in the navigation software. If the cleaning robot travels at the same time against a wall without a skirting board, the distance remaining from the wall is thus equal to zero, while in the case of an impact against a skirting board projecting from the wall it detects a distance of greater than zero. By the method according to the invention, therefore, it is possible to enable the cleaning robot to learn the approach boundaries, even in rooms with walls having skirting boards, whereby it is possible to achieve an improved cleaning of an edge along the skirting board, and thus in particular an improved cleaning result. It is also particularly advantageous that a navigation of the cleaning robot is possible virtually exclusively via the distance detector, and at the same time the cleaning of edges can be improved without additional sensor systems. This results in a significant benefit for a user.

In an advantageous development of the method according to the invention, the cleaning robot continues its first cleaning pass until it strikes once again against the skirting board, whereupon the impact sensor generates a further signal and the computer facility calculates an associated further spatial point from the further signal. Also associated with this further spatial point, when the cleaning robot strikes against the skirting board the distance detector detects a further distance from the wall which is associated with the further spatial point. The computer facility now considers the further spatial point, for adapting the first straight line calculated from the first and second spatial points, only if this further spatial point falls below a predefined distance from the first straight line. The computer facility does not consider the further spatial point if the further spatial point is at or exceeds the predefined distance from the first straight line. As a result, it is always possible to adapt the calculated first straight line and thereby to relativize or compare a measuring inaccuracy of individual measured spatial points. With this advantageous development of the method according to the invention, it is also possible to differentiate between a random impact of the cleaning robot against an obstacle and an impact against the skirting board, and as a result to leave out the random impact of the cleaning robot against an obstacle relative to an adaptation of the first straight line. This is the case, in particular, if the further spatial point is at or exceeds the predefined distance from the first straight line. In this case, therefore, it can be concluded with relatively high reliability that the further spatial point does not belong to the first straight line but is caused by a random impact against a different obstacle. As a result, it is also possible to provide a self-learning effect which can be perceived by a user, and at the same time it is possible to minimize concerns which are possibly present regarding damage to the skirting board by a repeated impact.

In a further advantageous embodiment of the method according to the invention, the computer facility calculates a second straight line from the distances from the wall which have been detected at least at the first and second spatial points, and discards the first straight line if a predefined angular deviation between the two straight lines is exceeded. Generally, the first straight line, which is located through at least the first and second spatial points, would have to run parallel to the wall, i.e. theoretically the first and second distances would have to be at least approximately the same, provided the thickness of the skirting board is identical. Thus in the ideal case the predefined angular deviation would have to be equal to zero, so that the first and second straight lines run in parallel. If the lines do not run in parallel, by means of this advantageous embodiment of the method according to the invention, a predefined angular deviation is established, for example of 0.2 to 0.5 degrees, which potentially can be caused by the presence of uneven wall plaster. Greater angular deviations, however, would indicate that the first straight line contains an error so that this first straight line is preferably determined once again.

In a further advantageous embodiment of the method according to the invention, the first distance corresponds to a thickness of the skirting board at the first spatial point. Similarly, the second distance also corresponds to a thickness of the skirting board at the second spatial point. Generally, with skirting boards of equal thickness, the first and second distance would have to be of the same size. For example, a control of the method according to the invention is also possible thereby, so that with each impact against the skirting board the computer facility determines the associated spatial point and the associated distance from the wall, and compares the individual distances with one another, wherein only tolerance-induced deviations of the distances, which for example indicate manufacturing tolerances of the skirting board, can be permitted here.

In this case, the distance detector can have a distance sensor for measuring the distance from the wall at the respective spatial point, whereby a permanent detection of the spatial conditions and a continuous adaptation of the approach to the skirting board or the approach boundary are possible. Alternatively, it is also conceivable that, for different spatial points, individually associated distances from the wall and thus thicknesses of the skirting boards, present at the respective spatial point, are input in advance into a map, for example via an app, and with an impact against the skirting board the distance sensor uses the distance input for this spatial point. With the possibility of specifying the thickness/hardness of the skirting boards in the app, it is possible to achieve an improvement in the navigation behavior and the cleaning of corners and edges. This is possible, for example, for each room separately. Thus it is possible to adapt the distance of the cleaning robot from the skirting board accurately to the conditions. This could be increased further and individual walls or even individual wall portions could be changed, or the thicknesses of the skirting boards attached thereto could be input separately. Thus, for example, a full-length mirror could be incorporated in the map and the cleaning robot would navigate differently in this region. The cleaning of corners and edges is thus improved without the use of a rotating side brush. Moreover, the constant impact against harder skirting boards, and thus also damage thereto, could be prevented thereby and thus the cleaning robot could have a smarter navigation.

The present invention is also based on the general idea of specifying a cleaning robot having an impact sensor and a distance detector which is arranged thereabove in the operating state, and a computer facility, wherein the computer facility according to the invention is configured for carrying out the above-described method. As a result, it is possible to provide a cleaning robot which is preferably exclusively navigated via a distance detector and at the same time achieves a significantly improved cleaning result, since it detects a spatial boundary present in walls with skirting boards significantly more effectively than was possible with the previous cleaning robots.

In a further advantageous embodiment of the cleaning robot according to the invention, the distance detector or the at least one distance detector is arranged at the top on the cleaning robot, for example in a tower, or on the front side thereof above the impact sensor. As a result, it is possible to arrange the distance detector sufficiently high that it always detects a distance from the respective wall above a skirting board and thereby the method according to the invention can be carried out.

Expediently, the impact sensor is arranged in a resilient bumper bar of the cleaning robot. As a result, a relatively light impact of the cleaning robot against the skirting board can be achieved, whereby in particular damage of any kind can be virtually entirely eliminated.

Further important features and advantages of the invention emerge from the subclaims, from the drawings and from the associated description of the figures by way of the drawings.

It goes without saying that the aforementioned features to be described in more detail below can be used not only in the respectively specified combination but also in other combinations or individually without departing from the scope of the present invention.

Preferred embodiments of the invention are shown in the drawings and are described in more detail in the following description, wherein the same reference characters refer to components which are the same or similar or functionally the same.

DETAILED DESCRIPTION OF THE INVENTION

Figure 1:
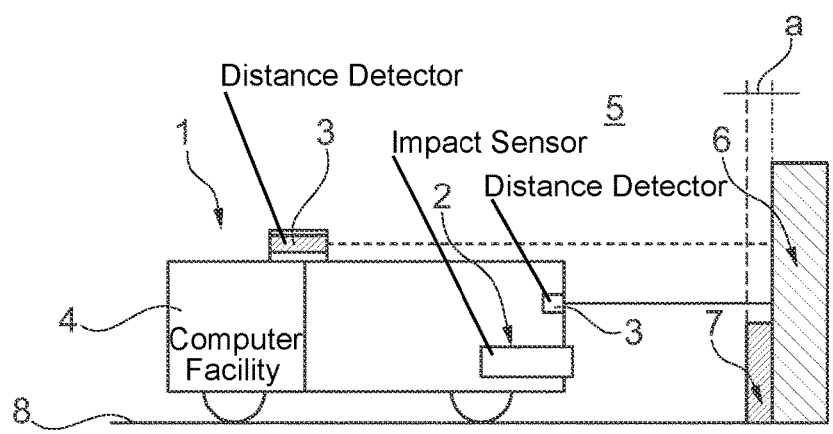
FIG. 1 shows a cleaning robot according to the invention when carrying out a method according to the invention for improved cleaning of edges of a wall.
Figure 2:
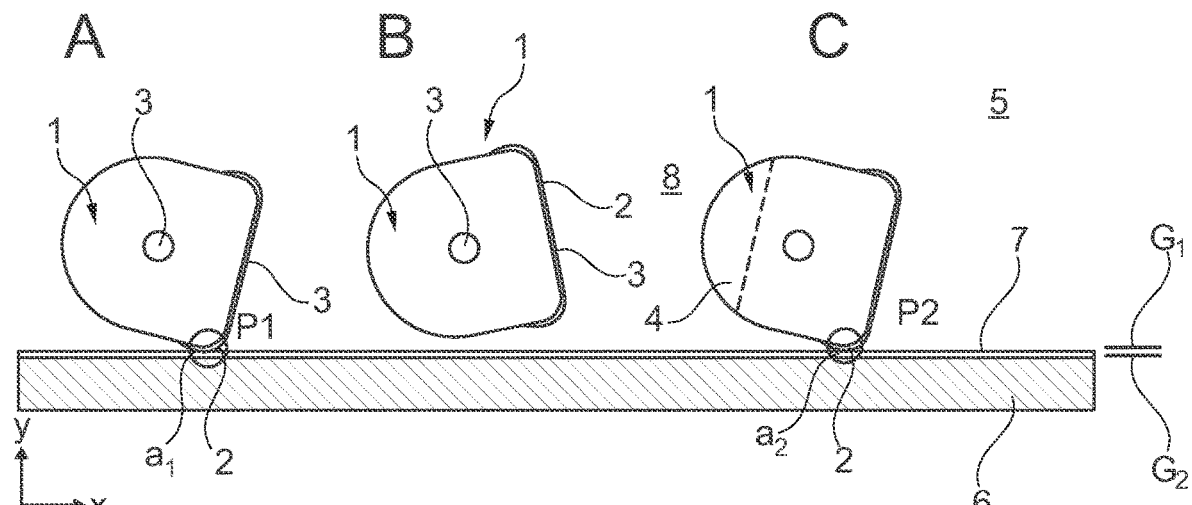
FIG. 2 shows individual method steps of the method according to the invention.
Figure 3:
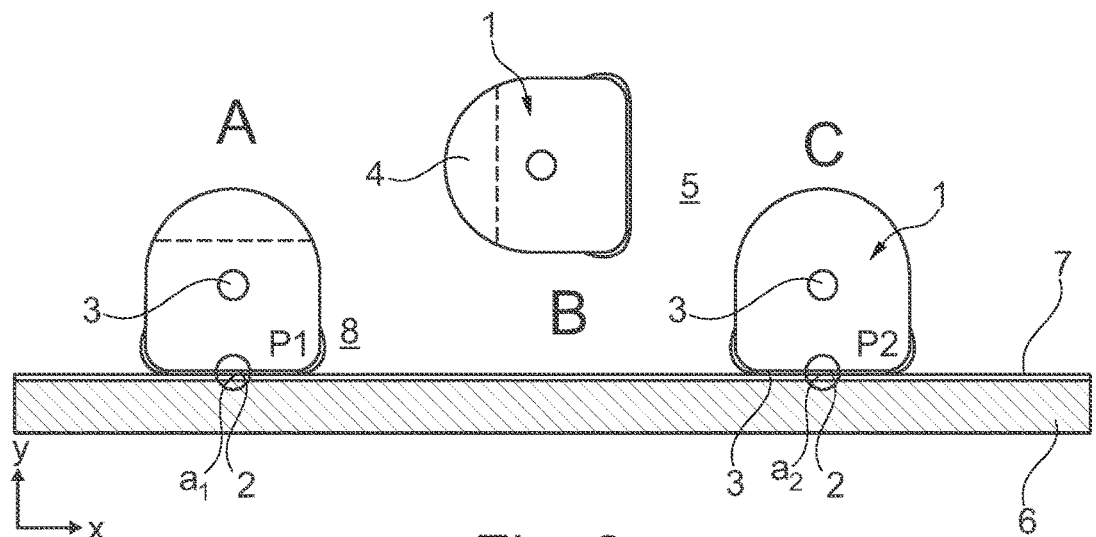
FIG. 3 shows a view as in FIG. 2 but with a different approach of the cleaning robot relative to the wall.

According to FIGS. 1 to 3, a cleaning robot 1 according to the invention has at least one impact sensor 2 and a distance detector 3 which is arranged thereabove in the operating state, i.e. during normal travel, and a computer facility 4. The cleaning robot 1 shown according to FIGS. 1 to 3 has in this case two distance detectors 3, namely a distance detector 3 arranged at the top in a tower and a distance detector on the front side. According to FIGS. 1 to 3, a wall 6 defining a room 5 with a skirting board 7 arranged in front of said wall is additionally shown, wherein the cleaning robot 1 cleans a floor 8 of the room 5. In order to be able to carry out at the same time, in particular, an improved cleaning of edges of the wall 6 with the skirting board 7 projecting therefrom, the method according to the invention is provided as described in the following paragraphs:

In this method according to the invention, the cleaning robot 1 is initially activated and strikes against the skirting board 7 with a first cleaning pass, whereupon the impact sensor 2 generates a first signal and the distance detector 3 determines a first distance a from the wall 6. This is denoted according to FIGS. 2 and 3 by the method step A. Then the cleaning robot 1 continues its first cleaning pass until it strikes against the skirting board 7 at least once more, which is denoted according to FIGS. 2 and 3 by the method state C. When the cleaning robot strikes again against the skirting board 7 the impact sensor 2 generates a second signal and the distance detector 3 detects a second distance a from the wall 6. The computer facility 4 of the cleaning robot 1 now calculates from the first and second signal two spatial points $P_1$ and $P_2$ (see FIGS. 2 and 3) and a first straight line running through these two spatial points $P_1$ and $P_2$. This first straight line runs according to FIG. 1 on an outer face of the skirting board 7. By using the distances a at the individual spatial points $P_1$ and $P_2$, and the two spatial points $P_1$ and $P_2$, the computer facility 4 now determines an approach boundary of the cleaning robot 1 relative to the wall 6 for the subsequent cleaning passes. In this case, the distance a between the cleaning robot 1 and the wall 6 is corrected by the determined thickness of the skirting board 7 so that in the subsequent cleaning passes the cleaning robot 1 travels in a significantly improved manner along the skirting board 7 and can carry out a significantly improved cleaning of the edges there.

By the method according to the invention, it is possible for the first time to navigate the cleaning robot 1 exclusively via a distance detector 3, and this is the case even with walls 6 which have skirting boards 7 arranged in front of said walls, wherein at the same time by considering the thickness of the skirting board 7, i.e. the distance a, a particularly accurate approach of the cleaning robot 1 to the approach boundary or skirting board 7 and thus a significantly improved cleaning of edges is made possible.

In this case, the distance detector 3 can have a distance sensor for measuring the distance a from the wall 6 at the respective spatial point $P_1$, $P_2$, or generally at any spatial point P, whereby a permanent detection of the spatial conditions and a continuous adaptation of the approach to the skirting board 7 or the approach boundary takes place. Alternatively, it is also conceivable that, for different spatial points P, individually associated distances a from the wall 6 and thus thickness of the skirting boards 7 present at the respective spatial point P are input in advance, for example via an app, and with an impact against the skirting board 7 the distance detector 3 uses the distance input for this spatial point P. With the possibility of specifying the thickness/hardness of the skirting boards 7 in the app, it is possible to achieve an improvement in the navigation behavior and the cleaning of corners and edges. This is possible, for example, for each room separately. Thus it is possible to adapt the distance a of the cleaning robot 1 from the skirting board 7 accurately to the conditions. This could be increased further and individual walls 6 or even individual wall portions could be changed, or the thicknesses of the skirting boards 7 attached thereto could be input separately. Thus, for example, a full-length mirror could be incorporated in the map and the cleaning robot 1 would navigate differently in this region. The cleaning of the corners and edges is enhanced to the best possible cleaning (without the use of a rotating side brush). Moreover, the constant impact against harder skirting boards, and thus also damage thereto, could be prevented thereby and thus the cleaning robot 1 could have a smarter navigation.

In a development of the method according to the invention, the cleaning robot now continues its first cleaning pass until it strikes again against the skirting board 7, whereupon the impact sensor 2 generates a further signal and the distance detector 3 detects a further distance a from the wall. The computer facility 4 calculates from the further signal a further spatial point which is considered for adapting the first straight line calculated from the first and second spatial points $P_1$ and $P_2$, if the further spatial point falls below a predefined distance from the first straight line, and is not considered if this further spatial point is at or exceeds the predefined distance from the first straight line. As a result, it is possible in particular to differentiate clearly between a random impact of the cleaning robot 1 against an obstacle, from an impact against the skirting board 7 and to eliminate the random impact. Naturally, as a result, further measured points can also be detected by a regression direction and included in the calculation of the straight line, whereby this can be adapted or improved.

The computer facility 4 can also calculate a second straight line from the distances a from the wall 6 detected at least at the first and second spatial points $P_1$ and $P_2$, and discard the first straight line if a predefined angular deviation between the two straight lines is exceeded.

According to FIGS. 2 and 3, the two straight lines $G_1$ and $G_2$ would have to run in parallel and thereby have an angular deviation of 0 degrees. By the predetermination of the predefined angular deviation, for example of 0.5 degrees, in this case the first straight line $G_1$ can be discarded if the angular deviation is too great and this indicates a measuring inaccuracy when the first straight line $G_1$ is created.

Generally in the method according to the invention, the distance a between the cleaning robot 1 and the wall 6, which is detected by the distance detectors 3, for example, and which is measured or is read from a map with previously input values, corresponds to the thickness of the skirting board 7. The distances a from the respective spatial points $P_1$ and $P_2$ would accordingly have to be generally identical.

By the method according to the invention and the cleaning robot 1 according to the invention, it is possible for the first time to achieve thereby a navigation which is controlled purely via a distance detector 3, with at the same time an improved cleaning of edges in the case of walls 6 which have skirting boards 7. In particular, an additional complex sensor system, such as for example a LIDAR system, is not required.

LIST OF REFERENCE CHARACTERS

1 Cleaning robot
2 Impact sensor
3 Distance detector
4 Computer facility
5 Room
6 Wall
7 Skirting board
8 Floor
a Distance
$a_1$ First distance
$a_2$ Second distance
$G_1$ First straight line
$G_2$ Second straight line
P Spatial point
$P_1$ Spatial point
$P_2$ Spatial point

The invention claimed is:

1. A method of using a cleaning robot for the improved cleaning of edges of a wall having a projecting baseboard, the method comprising:
providing the cleaning robot with at least one impact sensor and at least one distance detector disposed above the at least one impact sensor in an operating state;
using the cleaning robot to strike against the baseboard in a first cleaning pass, causing the at least one impact sensor to generate a first signal and causing the at least one distance detector to detect a first distance from the wall;
using the cleaning robot to continue the first cleaning pass until the cleaning robot strikes against the baseboard at least once more, causing the at least one impact sensor to generate a second signal and the at least one distance detector to detect a second distance from the wall;
using a computer facility of the cleaning robot to calculate from the first and second signals two spatial points and a first straight line running through the two spatial points;
using the computer facility to determine an approach boundary of the cleaning robot relative to the wall for subsequent cleaning passes, by using the distances and the two spatial points; and
using the computer facility to control the cleaning robot during subsequent cleaning passes exclusively by using the at least one distance detector, causing the cleaning robot to only travel as far as the approach boundary and thereby permitting an improved cleaning of edges.

2. The method according to claim 1, which further comprises:
using the cleaning robot to continue the first cleaning pass until the cleaning robot strikes once again against the baseboard, causing the at least one impact sensor to generate a further signal and the at least one distance detector to detect a further distance from the wall;
using the computer facility to calculate a further spatial point from the further signal; and
using the computer facility to consider the further spatial point for adapting the first straight line calculated from the first and second spatial points upon the further spatial point falling below a predefined distance from the first straight line, and using the computer facility to not consider the further spatial point upon the further spatial point being at or exceeding the predefined distance from the first straight line.

3. The method according to claim 1, which further comprises using the computer facility to calculate a second straight line from the distances from the wall detected at least at the first and the second spatial points and to discard the first straight line upon a predefined angular deviation between the two straight lines being exceeded.

4. The method according to claim 1, which further comprises causing the first distance to correspond to a thickness of the baseboard at the first spatial point.

5. The method according to claim 4, which further comprises causing the second distance to correspond to a thickness of the baseboard at the second spatial point.

6. The method according to claim 1, which further comprises:
using a distance sensor of the at least one distance detector for measuring the distance from the wall at a respective spatial point, or
for different spatial points, inputting individually associated distances from the wall and thus thicknesses of the baseboards in advance and, upon an impact against the baseboard, causing the at least one distance detector to use the distance input for the spatial point.

7. A cleaning robot, comprising:
at least one impact sensor;
at least one distance detector disposed above said at least one impact sensor in an operating state; and
a computer facility configured for carrying out the method according to claim 1.

8. The cleaning robot according to claim 7, which further comprises a top and a front side of the cleaning robot, said at least one distance detector being disposed at said top or on said front side above said at least one impact sensor.

9. The cleaning robot according to claim 7, which further comprises a resilient bumper bar in which said at least one impact sensor is disposed.

* * * * *